United States Patent [19]

Okamoto et al.

[11] Patent Number: 4,546,795
[45] Date of Patent: Oct. 15, 1985

[54] SOLENOID VALVE

[75] Inventors: Yoshio Okamoto, Ibaraki; Kazumi Iwai, Mito; Hiroshi Inoue; Yoshifumi Kunugi, both of Ibaraki; Tadashi Shinozaki, Tsuchiura, all of Japan

[73] Assignee: Hitachi, Ltd., Tokyo, Japan

[21] Appl. No.: 662,555

[22] Filed: Oct. 19, 1984

Related U.S. Application Data

[63] Continuation of Ser. No. 323,573, Nov. 20, 1981, abandoned.

[30] Foreign Application Priority Data

Dec. 26, 1980 [JP] Japan ................. 55-183891
Dec. 26, 1980 [JP] Japan ................. 55-183892
Dec. 26, 1980 [JP] Japan ................. 55-186478

[51] Int. Cl.⁴ .................................. F16K 31/02
[52] U.S. Cl. ................... 137/624.15; 251/129.05
[58] Field of Search .................. 251/129, 141; 137/624.13, 624.15

[56] References Cited

U.S. PATENT DOCUMENTS

| | | | |
|---|---|---|---|
| 2,741,088 | 4/1956 | Andrews et al. | 137/624.15 |
| 3,079,947 | 3/1963 | Hunt | 137/545 |
| 3,219,095 | 11/1965 | Nilsson | 251/129 |
| 3,421,546 | 1/1969 | Jennings et al. | 251/129 |
| 3,446,473 | 5/1969 | Barker | 251/129 |
| 3,451,429 | 6/1969 | Vick | 251/129 |
| 3,472,483 | 10/1969 | Janczur | 251/129 |
| 3,502,100 | 3/1970 | Jonson | 137/495 |
| 3,538,954 | 11/1970 | Fagerlie et al. | 251/141 |
| 3,659,631 | 5/1972 | Rakoske | 251/141 |
| 3,680,586 | 8/1972 | Bourgeois | 137/501 |
| 3,684,238 | 8/1972 | Michellone et al. | 251/129 |
| 3,732,893 | 5/1973 | Ziesche et al. | 251/129 |
| 3,829,060 | 8/1974 | von Lewis | 251/129 |
| 3,874,407 | 4/1975 | Griswold | 137/596.17 |
| 3,937,252 | 2/1976 | Ishida | 137/624.13 |
| 4,021,152 | 5/1977 | Toyoda | 251/141 |
| 4,058,960 | 11/1977 | Movshovich et al. | 137/624.13 |
| 4,257,533 | 3/1981 | Matsuyama et al. | 137/624.15 |
| 4,319,606 | 3/1982 | Hoogenboom | 251/129 |

FOREIGN PATENT DOCUMENTS 2339592 2/1975 Fed. Rep. of Germany ...... 251/129

Primary Examiner—Alan Cohan
Assistant Examiner—John A. Rivell
Attorney, Agent, or Firm—Antonelli, Terry & Wands

[57] ABSTRACT

A solenoid valve in which a pulse signal is applied to an electromagnet thereof to eliminate an electric hysteresis. The solenoid valve includes a piston-like valve slidably supported in a cylinder, and at least one aperture, for communicating with a fluid inlet and a fluid outlet, provided in at least one of the valve and cylinder, whereby the flow rate of a fluid may be continuously controlled and the collision between the valve and a valve seat may be avoided.

11 Claims, 9 Drawing Figures

T: CONSTANT

P: CONSTANT

SOLENOID VALVE

This is a continuation of Application Ser. No. 323,573 filed Nov. 20, 1981 now abandoned.

The present invention relates to a control valve for controlling a flow rate in proportion to an electric input signal, and, more particularly, to a solenoid valve suitable for the proportional control of air-fuel ratio in a household burner and for controlling the flow of coolant in a refrigerator.

A solenoid or stop valve in which the valve is closed by an electromagnetic force to stop the flow of a fluid, is well known as is disclosed, in for example, Japanese Patent Publication No. 6918/1963 entitled "Valve Device", Ranco Incorporated on Feb. 12, 1960. However, solenoid valves of this type do not have a function of continuously controlling a flow rate.

Another type solenoid valve is known in which the value of an electric signal (voltage) applied to an electromagnet is varied so as to change the cross section of a flow path thereby continuously controlling a flow rate. In such a solenoid valve, however, an electric hysteresis is generated when a plunger of the solenoid valve is reciprocated. More particularly, a relationship between the input voltage and the displacement of the plunger is different between the input voltage increasing period and the input voltage decreasing period. That is, it has been confirmed that the amount of displacement of the plunger of the valve at the input voltage increasing period is significantly different from that at the input voltage decreasing period by more than 10 percent for the same value of the input voltage. Accordingly, the flow rate of a fluid is also different between the input voltage increasing period and the input voltage decreasing period. In a burner in which proportional control with a constant air-fuel ratio is required, there arises a problem that correcting means or the like has to be additionally provided to the burner.

In, for example, Japanese Patent Publication No. 27245/1980, it is proposed to eliminate the above-mentioned electric hysteresis by applying an electric signal in the form of a pulse to the electromagnet.

Accordingly, in order to obtain a solenoid or stop valve in which the electric hysteresis may be eliminated and a continuous control of flow rate may be attained, it is considered necessary to apply a pulse signal to the stop valve; however, with this approach a valve may so violently collide with a valve seat so as to result in the production of fatigue. Thus, the service life of the stop valve may be reduced and, loud noises may be produced when the collision between the valve and the valve seat occurs so that the stop valve may not be put into practical use.

Accordingly, an object of the present invention is to provide a solenoid valve in which a pulse signal is used to eliminate an electric hysteresis, which can continuously control a flow rate, and in which a collision between a valve and a valve seat is avoided.

In order to attain the above object, according to the present invention, a solenoid valve is provided which includes a piston-like valve slidable within a cylinder, with an aperture, communicating with a fluid inlet and a fluid outlet, being provided in the valve or cylinder, and with a pulse signal being applied to an electromagnet whereby a plunger connected with the valve is reciprocated.

These and other objects and features of the present invention will become more apparent from the following description taken in conjunction with the accompanying drawings, in which.

Figure 1:
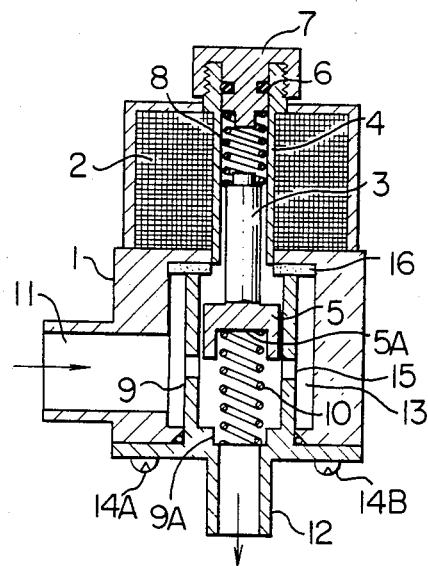
FIG. 1 is a longitudinal cross-sectional view of a solenoid valve according to the present invention.
Figure 3:
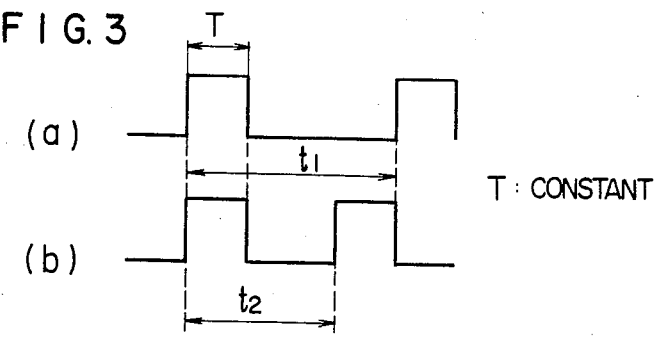
Figure 4:
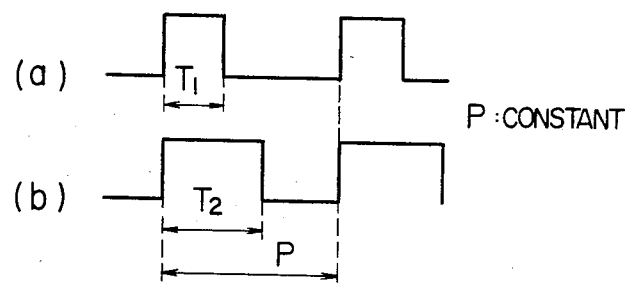
Figure 5:
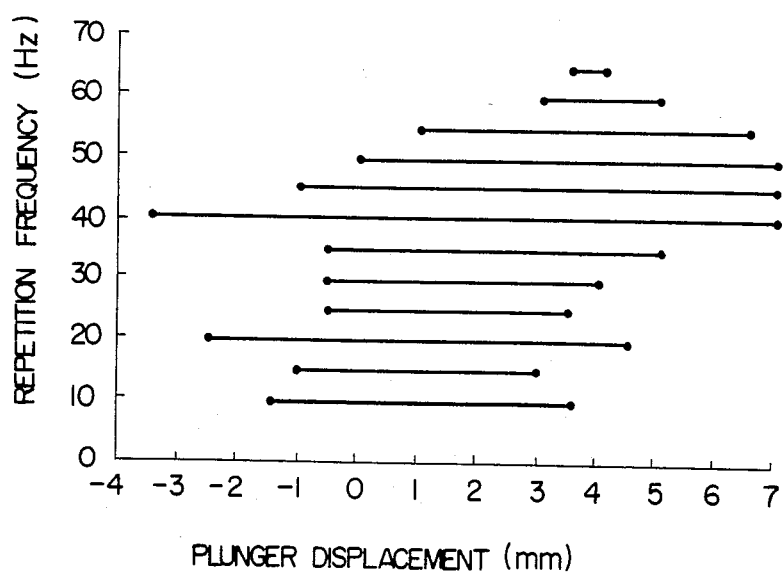
Figure 6:
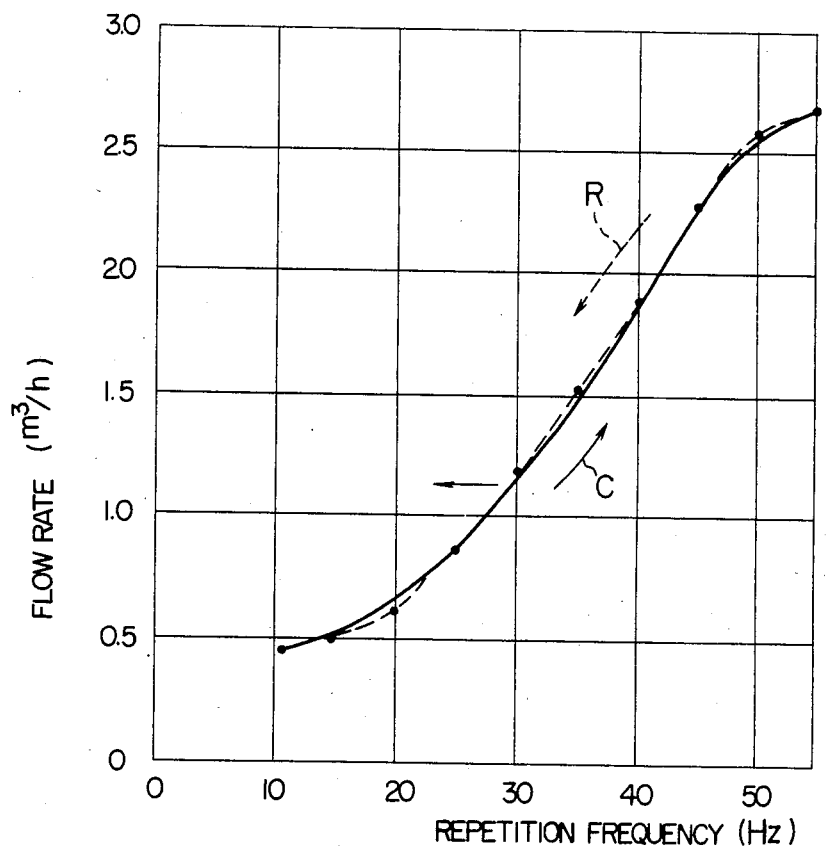
Figure 9:
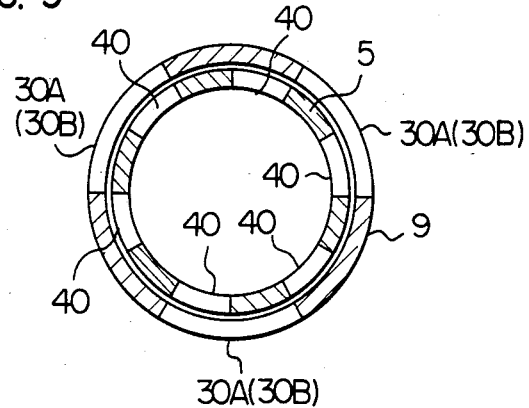
Figure 7:
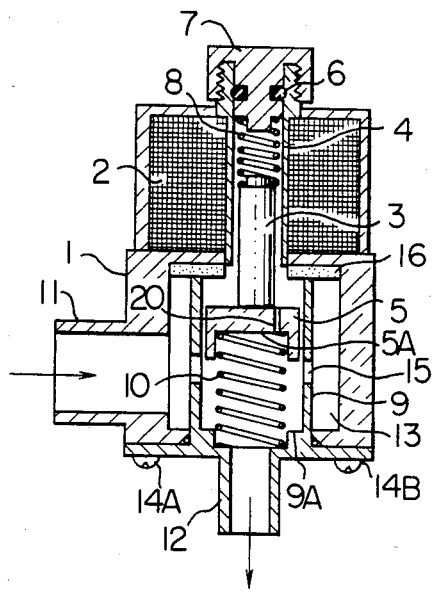
Figure 8:
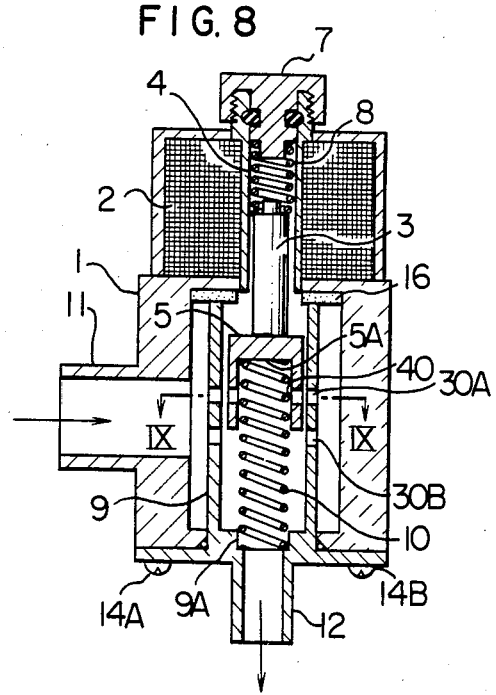

FIGS. 3(a) and 3(b) are waveform diagrams of variable frequency pulse signals applied to an electromagnet of the solenoid valve in FIG. 1;

FIGS. 4(a) and 4(b) are waveform diagrams of a variable width pulse signal applied to the electromagnet of the solenoid valve of FIG. 1;

FIG. 5 is a graphical illustration of a relationship between a displacement of a plunger of the solenoid valve and the frequency in a solenoid valve according to the present invention;

FIG. 6 is a graphical illustration of a relationship between the frequency and the flow rate as the results of experiments made on a solenoid valve according to the present invention;

FIG. 7 is a longitudinal cross-sectional view of a third embodiment of a solenoid valve according to the present invention;

FIG. 8 is a longitudinal cross-sectional view of a fourth embodiment of a solenoid valve according to the present invention; and FIG. 9 is a cross-sectional view taken along the line IX—IX in FIG. 8.

Referring now to the drawings wherein like reference numerals are used throughout the various views to designate like parts and, more particularly, to FIG. 1, according to this figure, a solenoid valve for controlling a gas flow includes a solenoid valve body 1 formed with a gas chamber 13 and a gas inlet 11 communicating with the gas chamber 13, with an electromagnetic coil 2 being disposed in the solenoid valve body 1. A plunger case 4, of a non-magnetic material and provided along longitudinal center axis of the coil 2 accommodates a plunger 3 for reciprocable movement therein. The plunger 3 is engaged at a lower end thereof with a piston valve 5 having a cup-shaped cross section. The engagement between the plunger 3 and piston valve 5 may be achieved by integral formation or, preferably, by simple abutting contact between the plunger 3 and piston valve 5 with no connecting means therebetween. A magnetic head 7 is threaded onto the plunger case 4 with a ring 6 provided therebetween. A spring 8 is interposed between the magnetic head 7 and the upper surface of the plunger 3.

Another spring 10 is interposed between a lower depressed portion 5A of the piston valve 5 and a lower stepped portion 9A of a cylinder 9 which will be explained later. The piston valve 5 integrated with the plunger 3, is maintained in a balanced condition by means of repulsive or opposing forces of the springs 8 and 10.

The cylinder 9 is provided with a gas outlet 12, and is arranged in the gas chamber 13 such that the piston valve 5 fits into the cylinder 9. A flange portion of the cylinder 9 is fastened to the solenoid valve body 1 by attaching bolts 14A and 14B. The cylinder 9 is provided, substantially at its longitudinally central part thereof with one or more apertures 15 for enabling the gas inlet 11 to selectively communicate with the gas outlet 12. The upper end of the cylinder 9 is connected to a portion of the solenoid valve body 1 through a seal material 16 to prevent the gas within the cylinder 9 from escaping into the gas chamber 13. A gap g is provided between the piston valve 5 and the cylinder 9 to prevent the piston valve 5 from being put in mechanical contact with the inner wall of the cylinder 9. The dimension of the gap g is selected to fall within a range from 0.02 to 0.10 mm, taking into consideration the amount of gas escaping through the gap g.

Figure 2:
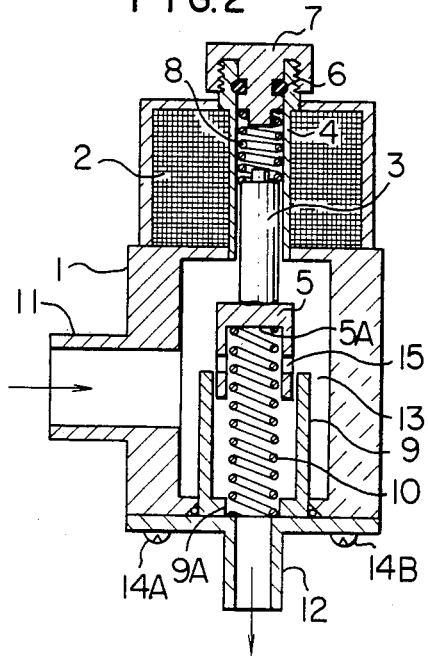
FIG. 2 is a longitudinal cross-sectional view of a second embodiment of a solenoid valve according to the present invention.

In FIG. 1 at least one aperture 15 is provided in the cylinder 9; however, as shown in FIG. 2, with a cylinder 9 having a short axial length, at least one aperture 15 may be provided in the piston valve 5; however, in all other respects, the structural features of the solenoid valve of FIG. 2 are the same as those in FIG. 1.

The solenoid valves in FIGS. 1 and 2 operate in the following manner.

Pulse signals are applied to the electromagnetic coil 2 to generate an electromagnetic force, as a result thereof, the piston valve 5 repeatedly moves up and down to provide a balanced condition between the generated electromagnetic force and the forces of the springs 8 and 10, so that the gas communicating aperture 15 in the cylinder 9 or valve 5 repeatedly opens and closes to thereby continuously control the flow rate at the gas outlet 12.

The pulse signal may have a waveform such as shown in FIGS. 3(a) and 3(b), whereby the repetition period, i.e. repetition frequency, of the pulse is varied, for example, to be $t_1$ as shown in FIG. 3(a) or to be $t_2$ as shown in FIG. 3(b), while the pulse width T of the pulse for causing the aperture 15 to be opened (or alternatively to be closed) is maintained constant as shown in FIG. 3(a) and FIG. 3(b). Alternatively, as shown in FIGS. 4(a) and 4(b), that the pulse width of the pulse for causing the aperture 15 to be opened (or alternatively to be closed) is varied, for example, to be $T_1$ as shown in FIG. 4(a) or to be $T_2$ as shown in FIG. 4(b), while the repetition period P (i.e. frequency) of the pulse is maintained as seen in FIGS. 4(a) and (b).

The dimension of the aperture 15 provided in the cylinder 9 or valve 5 may be determined by the ranges of displacement shown in FIG. 5. The values in FIG. 5 were obtained by experiments in which the spring load was selected to be 185 g and pulses each having pulse width T of 8 msec were applied to the electromagnetic coil 2.

In the solenoid valve according to the embodiments of the present invention, the piston valve 5 moves up and down to make the aperture 15 open and close, so that the flow rate of gas may be controlled continuously in accordance with the pulse signal, without being affected by the electric hysteresis, so as to obtain a desired flow rate, and furthermore, such a loud sound which is caused by the collision between the valve and the valve seat as occurred in the conventional solenoid may be eliminated with high reliability.

In the above-mentioned explanation, either of the pulse signal of variable frequency (FIGS. 3(a), 3(b)) or the pulse signal of variable pulse width (FIGS. 4(a), 4(b)) has been applied to the electromagnetic coil 2. However, it is also possible to continuously change the flow rate of gas by employing a combination of the above-mentioned pulse signals so as to obtain a desired flow rate. In this case, the flow rate may be controlled in a wider range to obtain a greater value of flow rate, without making the solenoid valve large in size, while a somewhat complicated control is required.

FIG. 6 shows the results of a performance test which was made on a solenoid valve according to the embodiments of the present invention using the air as the fluid. As is apparent from FIG. 6, the flow rate varies continuously in accordance with the frequency of the pulse signal, and there is no significant difference between the flow rate at the frequency increasing period C and that at the frequency decreasing period R with respect to the same frequency, so that a desired flow rate can be obtained with high accuracy.

In the embodiment shown in FIG. 1, gas flowing into the cylinder is compressed due to the vertical motion of the piston valve 5 and, therefore, the valve 5 is pushed back by a strong force applied to the lower surface 5A of the valve 5.

By the way, the flow rate Q obtained by a solenoid valve according to the embodiment of the present invention is expressed by the following equation:

$$Q = \frac{T_0 \cdot f}{1000} \cdot C \cdot A \cdot \sqrt{\Delta P}$$

where To represents the open period of the gas communicating aperture, f the frequency of the applied pulse signal, C the flow coefficient, A the area of opening of the gas communicating aperture, and $\Delta P$ the pressure loss.

As is apparent from the above equation, a maximum value of flow rate in solenoid valves having the same size is determined by the opening area A of the gas communicating aperture in the case where the pressure loss $\Delta P$ is kept constant. The opening area A is determined in dependence upon the diplacement of the piston valve 5, as mentioned previously. That is, in the case where the diameter of the cylinder is fixed, the flow rate may be increased as the displacement of the piston valve 5 is greater.

FIG. 7 provides an example of a solenoid valve which enables a greater displacement of the piston and, for this purpose, an escape hole 20 is provided in the piston valve 5 to eliminate a restoring force which pushes back the piston valve 5. A substantially hermetically sealed space defined by the inner wall of the cylinder 9 and the outer wall of the piston valve 5 communicates with a space defined by the depressed portion 5A of the piston valve 5 and the inner wall of the cylinder 9, through the escape hole 20. However, in all other respects the solenoid valve of FIG. 7 is the same as the embodiment shown in FIG. 1.

With the solenoid valve of FIG. 7, when the piston valve 5 moves up in the cylinder 9, the gas which has flowed into the space defined by the inner wall of the cylinder 9 and the outer wall of the piston valve 5, is forced out quickly through the escape hole 20.

Accordingly, the gas which has flowed into the above-mentioned space does not affect the operation of the solenoid valve, and the displacement of the piston valve 5 may be greatly increased as compared with the embodiment shown in FIG. 1. Thus, when the respective solenoid valves of FIGS. 1 and 7 are made equal in size, the latter can produce a far larger flow rate as compared with the former.

In FIG. 8, a solenoid valve is provided whereby a wide range of flow rate is possible without increasing the size of the solenoid valve. More particularly, two gas communicating apertures 30A and 30B are provided in the cylinder 9, and the piston valve 5 is provided with a gas communicating aperture 40 which communicates, as necessary, with the apertures 30A and 30B.

In FIG. 8, for example, the gas which has passed through the aperture 30A is allowed to pass through the aperture 40 or is stopped by the outer side wall of the piston valve 5, and the gas which has passed through the aperture 30B is allowed to advance over the lowermost end surface of the piston valve 5 or is stopped by the outer side surface of the piston valve 5. Accordingly, the quantity of gas flow may be simply increased, and may be controlled in a wide range without making the valve itself larger in size.

In the thus arranged solenoid valve as shown in FIG. 8, a positional shift may occur between the aperture 40 of the piston valve 5 and the apertures 30A and 30B of the cylinder 9, in assembling the solenoid valve, or due to weak vibrations or resonance generated in operating the solenoid valve. The above-mentioned positional shift makes it impossible to obtain a desired opening area of the apertures 30A and 30B.

To solve the above noted problem arising from a positional shift, as shown in FIG. 9, a ratio of the number of the apertures 30A (or 30B), circumferentially equidistantly formed in the cylinder 9, to the number of the apertures 40, circumferentially equidistantly formed in the piston valve 5, is selected to be 1:2. That is, appropriate correlation is provided between the apertures 30A (or 30B) provided in the cylinder 9 and the apertures 40 provided in the piston valve 5, so that the total opening area of the apertures 30A (or 30B) have a predetermined value independently of the circumferential position of the piston valve 5 when the valve 5 is stopped.

As mentioned above, in FIG. 9, since the total opening area of the apertures provided in the cylinder 9 may have a predetermined value independently of the circumferential position of the valve 5 when the valve 5 is stopped, the flow rate is kept constant even if weak vibrations or resonance takes place in operating the solenoid valve.

We claim:

1. A solenoid valve including a fluid inlet, a fluid outlet, a plunger adapted to be reciprocated by an electromagnetic force and a force of a spring so as to selectively open or close one of said fluid inlet and said fluid outlet, a piston valve engageable with said plunger, a cylinder slidably accommodating said piston valve, aperture means provided in one of said piston valve and said cylinder for communicating said fluid inlet with said fluid outlet, said spring is interposed between an upper part of said plunger and a mangetic head mounted on a plunger casing, another spring is interposed between a lower part of said piston valve and a body of said solenoid valve whereby a balance condition is achieved between the electromagnetic force and said spring so as to enable a reciprocation of the plunger, said plunger and piston valve being supported solely by a balance of said two springs without contact of the piston valve with an inner wall of said cylinder, and wherein a pulse signal is applied to an electromagnet of said solenoid valve, with at least a pulse repetition period of said pulse signal being varied in a predetermined manner so as to cause a flow rate of the solenoid valve to change continuously so as to obtain a desired value of the flow rate.

2. A solenoid valve according to claim 1, wherein said aperture means is provided in said cylinder.

3. A solenoid valve according to claim 2, wherein said pulse signal is also variable in a pulse width thereof.

4. A solenoid valve according to claim 1, wherein said pulse signal is variable in both the pulse repetition period and in a pulse width thereof.

5. A solenoid valve according to claim 1, wherein said piston valve has a cup-shaped cross section.

6. A solenoid valve according to claim 1, wherein said piston valve moves up and down without contacting with an inner wall of said cylinder.

7. A solenoid valve according to claim 6, wherein a gap between said piston valve and said inner wall of said cylinder is within a range of 0.02 to 0.10 mm.

8. A solenoid valve according to claim 1, wherein said pulse signal has a frequency within a range of 10 to 50 Hz.

9. A solenoid valve according to claim 5, wherein said piston valve is provided with an escape hole for enabling a space defined by an upper outer surface of said piston valve and an inner wall of said cylinder to communicate with a space defined by a lower outer surface of said piston valve and the inner wall of said cylinder.

10. A solenoid valve according to claim 2, wherein said aperture means includes a plurality of apertures axially provided in said cylinder and an aperture provided in said piston valve for communicating with one of said apertures.

11. A solenoid valve according to claim 2, wherein said aperture means includes a plurality of apertures circumferentially provided in said cylinder and a plurality of apertures circumferentially provided in said piston valve for communicating with said apertures provided in said cylinder.

* * * * *